United States Patent
Kang et al.

(10) Patent No.: US 7,471,967 B2
(45) Date of Patent: Dec. 30, 2008

(54) WIRELESS COMMUNICATION TERMINAL WITH AN OPENING/CLOSING SENSING FUNCTION USING A PLURALITY OF MAGNETIC POLE SENSORS AND METHOD THEREFOR

(75) Inventors: Yong Sam Kang, Seoul (KR); Ji Nyeon Jung, Seoul (KR); Myung Hoon Lee, Seoul (KR); In Hyuk Kim, Seoul (KR); Kwang Ju Choi, Seoul (KR)

(73) Assignee: Pantech Co., Ltd., Seoul (KR)

( * ) Notice: Subject to any disclaimer, the term of this patent is extended or adjusted under 35 U.S.C. 154(b) by 443 days.

(21) Appl. No.: 11/257,919

(22) Filed: Oct. 25, 2005

(65) Prior Publication Data

US 2006/0105757 A1    May 18, 2006

(30) Foreign Application Priority Data

| Oct. 26, 2004 | (KR) | 10-2004-0085776 |
| Oct. 26, 2004 | (KR) | 10-2004-0085836 |
| Oct. 26, 2004 | (KR) | 10-2004-0085838 |
| Oct. 26, 2004 | (KR) | 10-2004-0085839 |
| Oct. 26, 2004 | (KR) | 10-2004-0085840 |

(51) Int. Cl.
*H04M 1/00* (2006.01)
(52) U.S. Cl. .................... 455/575.4; 455/418; 455/90.3
(58) Field of Classification Search ............. 455/575.1, 455/575.3, 575.4, 90.3, 128
See application file for complete search history.

(56) References Cited

U.S. PATENT DOCUMENTS

2003/0153372 A1* 8/2003 Shimamura et al. ......... 455/575
2006/0019714 A1* 1/2006 Lee et al. ..................... 455/566
2007/0088758 A1* 4/2007 Hwang ........................ 707/200

FOREIGN PATENT DOCUMENTS

| JP | 2001-320474 | 11/2001 |
| KR | 10-2001-0084258 A | 9/2001 |
| KR | 10-2004-0069875 A | 8/2004 |
| KR | 10-2004-0082486 A | 9/2004 |

* cited by examiner

*Primary Examiner*—Cong Van Tran
(74) *Attorney, Agent, or Firm*—H. C. Park & Associates, PLC

(57) ABSTRACT

A wireless communication terminal with an opening/closing function using a plurality of magnetic pole sensors and method therefor is provided. The invention activates or inactivates a display unit via a switch by sensing an opening/closing of a sub-body using the magnetic pole sensors, to thereby prevent a malfunctioning due to a magnetic pole caused by an external magnetic pole generator. The inventive wireless communication terminal comprises a first magnetic pole generator for generating a north (N) magnetic pole, a second magnetic pole generator for generating a south (S) magnetic pole, a first magnetic pole sensor for sensing the N magnetic pole from the first magnetic pole generator, a second magnetic pole sensor for sensing the S magnetic pole from the second magnetic pole generator, a controller for controlling an operation of a switch to activate or inactivate an output unit based on the sense result from the first and the second magnetic pole sensors, the switch performing a switching operation in response to a control signal from the controller, and the output unit activated or inactivated in accordance with the switching operation of the switch.

15 Claims, 15 Drawing Sheets

| Sub-body | Magnetic sensor | Switch | Display unit |
|----------|-----------------|--------|--------------|
| Close | Sense | Off | Deactivation |
| Open | Non-sense | On | Activation |

| Sub-body | Magnetic sensor | Magnetic sensing time | Switch | Display unit |
|---|---|---|---|---|
| Closed | Over 1st threshold magnetic force | Satisfied | Off | Not activated |
| Open | Under 1st threshold magnetic force | Satisfied | On | Activated |

| Sub-body | First magnetic pole sensor | Second magnetic pole sensor | Switch | Display unit |
|---|---|---|---|---|
| Close | Sense | Sense | Off | Deactivation |
| Close or open | Sense | Non-sense | Maintain previous state | |
| | Non-sense | Sense | | |
| Open | Non-sense | Non-sense | On | Activation |

FIG. 19

| Sub-body | First magnetic pole sensor | Second magnetic pole sensor | Time interval ($\Delta t$) | Switch | Display unit |
|---|---|---|---|---|---|
| Close | Sense | Sense | Normal | Off | Deactivation |
| Close or open | Sense | Non-sense | | Maintain previous state | |
| | Non-sense | Sense | | | |
| Open | Non-sense | Non-sense | Normal | On | Activation |

US 7,471,967 B2

WIRELESS COMMUNICATION TERMINAL WITH AN OPENING/CLOSING SENSING FUNCTION USING A PLURALITY OF MAGNETIC POLE SENSORS AND METHOD THEREFOR

CROSS REFERENCE TO RELATED APPLICATIONS

The present application claims priority from and the benefit of Korean Patent Application No. 2004-0085776, Korean Patent Application No. 2004-0085839, Korean Patent Application No. 2004-0085836, Korean Patent Application No. 2004-0085838, and Korean Patent Application No. 2004-0085840, each filed on Oct. 26, 2004, the entire contents of which are incorporated herein by reference.

1. Field of the Invention

The present invention relates to a wireless communication terminal with an opening/closing sensing function using a plurality of magnetic pole sensors and method therefore; and more particularly, to a wireless communication terminal with an opening/closing sensing function utilizing a plurality of magnetic pole sensors and method therefore, for activating or deactivating a display unit via a switch by sensing an opening/closing of a sub-body using the magnetic pole sensors.

2. Description of Related Art

A wireless communication terminal used herein refers to a portable wireless communication terminal such as PCS (personal communication services) terminal, PDA (personal digital assistant) terminal, smart phone, IMT-2000 (International Mobile Telecommunication-2000) terminal, wireless LAN terminal, or the like, which is capable of wirelessly transmitting and receiving voice, character, image data, etc.

In the wireless communication terminal, a sub-body is a part at which a display unit is placed, while a main body is a part to which a battery is connected.

Typically, such wireless communication terminals are classified into several types of terminals: folder-type terminal, slide-type terminal, swivel-type terminal, and so on. For the sake of illustration, the slide-type terminal will be presented in the following examples.

Also, two magnetic pole sensors will be illustrated in the description of the invention.

The greatest advantage of the wireless communication terminal among other things is that it can provide calling and called users with mobility. Owing to the mobility, the number of wireless communication subscribers has been increased in a geometrical progression, and the wireless communication terminal has widely been utilized by the general public in recent years.

However, as time goes on, such a mobility merit is gradually forgotten from the users of the wireless communication terminal; and, instead, a multi-function wireless communication terminal capable of offering more various supplementary services is required.

To meet such requirement, most of recently manufactured and sold wireless communication terminals are provided with such functions as radio broadcasting reception, music reproduction (such as MP3, MPEG layer 3, etc.), finger-pressure, blood sugar level sensing, ultrasound photographing, and the like, in addition to a camera function.

Further, as various types of wireless communication terminals with folder-type sub-body, swivel-type sub-body capable of 180° rotation in a fixed direction under an open state of folder, slide-type sub-body, etc. are out on the market, a variety of methods of sensing an opening/closing of the wireless communication terminal have also been proposed.

In the following, a conventional wireless communication terminal with an opening/closing sensing function using a single magnetic sensor will be introduced with reference to FIG. 1.

As shown in FIG. 1, the conventional wireless communication terminal with the opening/closing sensing function using the single magnetic sensor comprises a magnetic generator 14 for generating a magnetic, a magnetic sensor 15 for sensing the magnetic generated from the magnetic generator 14, a controller 17 for controlling an operation of a switch 16 to transfer a power to a display unit 11 in response to a non-sense signal occurring when the magnetic sensor 15 does not sense the magnetic, or block the power to the display unit 11 in response to a sense signal issuing when the magnetic sensor 15 senses the magnetic, the switch 16 for transferring or blocking the power to the display unit 11 under the control of the controller 17, and the display unit 11 activated or inactivated when it receives or does not receive the power via the switch 16.

In the foregoing, the magnetic sensor 15 outputs a sense signal (or on signal) if the magnetic is sensed, whereas it provides a non-sense signal (or off signal) if otherwise.

Now, an operation of the controller 17 will be described in more detail with reference to FIG. 2.

As shown in FIG. 2, the magnetic generator 14 for generating a magnetic is located on one side of a sub-body 12, and the magnetic sensor 15 is placed on one side of a main body 13, i.e., at a location where it can sense the magnetic produced from the magnetic generator 14 in case that the sub-body 12 is closed.

Thus, in case that the sub-body 12 is closed, the magnetic sensor 15 senses the magnetic created by the magnetic generator 14, and delivers a sense signal to the controller 17. Then, the controller 17 determines the sub-body 12 to be closed and makes the switch 16 turned off, thereby deactivating the display unit 11.

In the meantime, in case that the sub-body 12 is open, since the magnetic sensor 15 is placed at a certain distance from the magnetic generator 14, it does not sense the magnetic created by the magnetic generator 14, and dispatches a non-sense signal to the controller 17.

Hence, the controller 17 determines the sub-body 12 to be open upon receipt of the non-sense signal from the magnetic sensor 15, and makes the switch 16 turned on, thereby activating the display unit 11.

In the foregoing, while the controller 17 activates the display unit 11, it performs, in case that the sub-body 12 is open to receive a call, a function of connecting a call path and a stand-by function for making a telephone, including an activation of a key pad and a voice output unit. Further, while the controller 17 inactivates the display unit 11, it conducts, in case that the sub-body 12 is closed to end the call, a function of disconnecting the call path, including a deactivation of the key pad and the voice output unit.

Meanwhile, with regard to the opening/closing of the sub-body 12, an operation of each element is done as depicted in FIG. 3.

Specifically, if the magnetic sensor 15 senses a magnetic in a state that the sub-body 12 is closed, the switch 16 is turned off, allowing the display unit 11 to be inactivated.

In contrast, if the magnetic sensor 15 does not sense any magnetic in a state that the sub-body 12 is open, the switch 16 is turned on, permitting the display unit 11 to be activated.

As set forth in the foregoing, the conventional wireless communication terminal with the opening/closing sensing function using the single magnetic sensor determines whether or not the display unit 11 is activated by sensing the opening/ closing of the sub-body 12 through the single magnetic sensor 15. Hence, if the opening/closing of the sub-body 12 is not sensed by the single magnetic sensor 15 due to any magnetic created by a magnetic generation means (e.g., magnet) built in a supporter of a wireless communication terminal for car, the display unit 11 is caused to malfunction.

Namely, if the sub-body 12 is placed in the supporter in the state that it is open, the magnetic sensor 15 may sense the magnetic caused by the magnet built in the supporter. Consequently, the controller 17 may determine the sub-body 12 to be closed and then inactivate the display unit 11 although the sub-body 12 is actually open.

SUMMARY OF THE INVENTION

It is, therefore, a primary object of the present invention to provide a wireless communication terminal with an opening/closing function using a plurality of magnetic pole sensors and method therefore, for activating or deactivating a display unit via a switch by sensing an opening/closing of a sub-body using the magnetic pole sensors, respectively, to thereby prevent a malfunctioning due to a magnetic pole caused by an external magnetic pole generation means.

In accordance with one aspect of the present invention, there is provided a wireless communication terminal with an opening/closing sensing function using a plurality of magnetic pole sensors, the wireless communication terminal comprising: a first magnetic pole generator for generating a north (N) magnetic pole; a second magnetic pole generator for generating a south (S) magnetic pole; a first magnetic pole sensor for sensing the N magnetic pole from the first magnetic pole generator; a second magnetic pole sensor for sensing the S magnetic pole from the second magnetic pole generator; a controller for controlling an operation of a switch to activate or inactivate an output unit based on the sense result from the first and the second magnetic pole sensors; the switch for performing a switching operation in response to a control signal from the controller; and the output unit activated or inactivated in accordance with the switching operation of the switch.

In accordance with another aspect of the present invention, there is provided a wireless communication terminal with an opening/closing sensing function using a plurality of magnetic sensors, the wireless communication terminal comprising: a magnetic generator for generating a magnetic; a first and a second magnetic sensors for sensing the magnetic from the magnetic generator, respectively; a controller for controlling an operation of a switch to activate or inactivate an output unit based on the magnetic sense result from the first and the second magnetic sensors; the switch for performing a switching operation in response to a control signal from the controller; and the output unit activated or inactivated in accordance with the switching operation of the switch.

In accordance with still another aspect of the present invention, there is provided a wireless communication terminal with an opening/closing sensing function using a plurality of magnetic pole sensors, the wireless communication terminal comprising: a storage means for storing magnetic pole sense time interval information; a first magnetic pole generator for generating an N magnetic pole; a second magnetic pole generator for generating an S magnetic pole; a first magnetic pole sensor for sensing the N magnetic pole from the first magnetic pole generator; a second magnetic pole sensor for sensing the S magnetic pole from the second magnetic pole generator; a controller for sensing an opening/closing using the magnetic pole sense time interval information stored in the storage means when the magnetic poles are sensed by the first and the second magnetic pole sensors, and controlling an operation of a switch to activate or inactivate an output unit based on the sense result; the switch for performing a switching operation in response to a control signal from the controller; and the output unit activated or inactivated in accordance with the switching operation of the switch.

In accordance with a further aspect of the present invention, there is provided an opening/closing sensing method using a plurality of magnetic pole sensors in a wireless communication terminal, the method comprising the steps of: determining whether or not signals provided from a first and a second magnetic pole sensors are identical to one another; if it is determined that the signals are not identical, maintaining a current state of a switch and an output unit; if it is determined that the signals are identical, confirming if the signals are all sense signals; if it is confirmed that the signals are all the sense signals, causing the switch to be turned off, to thereby inactivate the output unit; and if it is confirmed that the signals are not all the sense signals, causing the switch to be turned on, to thereby activate the output unit.

In accordance with a still further aspect of the present invention, there is provided an opening/closing sensing method using a plurality of magnetic pole sensors in a wireless communication terminal, the method comprising the steps of: determining whether or not one of signals provided from a first and a second magnetic pole sensors is a sense signal and the other signal is a non-sense signal; if the determined result indicates that it is not the case that one signal is the sense signal and the other signal is the non-sense signal, maintaining a current state of a switch and an output unit; if the determined result indicates that it is the case that one signal is the sense signal and the other signal is the non-sense signal, confirming whether or not the sense signal is received from one of the first and the second magnetic pole sensors; if it is confirmed that the sense signal is from the first magnetic pole sensor, causing the switch to be turned off, to thereby inactivate the output unit; and if it is confirmed that the sense signal is from the second magnetic pole sensor, causing the switch to be turned on, to thereby activate the output unit.

In accordance with another aspect of the present invention, there is provided an opening/closing sensing method using a plurality of magnetic pole sensors in a wireless communication terminal, the method comprising the steps of: confirming whether or not signals from a first and a second magnetic pole sensors are received at a predefined time interval which corresponds to magnetic pole sensing time interval information; if it is confirmed that the signals are not received at the predefined time interval, maintaining a current state of a switch and an output unit; if it is confirmed that the signals are received at the predefined time interval, determining whether or not the signals are identical to each other; if it is determined that the signals are not identical, maintaining a current state of the switch and the output unit; if it is determined that the signals are identical, confirming whether or not the signals are all sense signals; if it is confirmed that the signals are all the sense signals, causing the switch to be turned off, to thereby inactivate the output unit; and if it is confirmed that the signals are all the non-sense signals, causing the switch to be turned on, to thereby activate the output unit.

The other objectives and advantages of the invention will be understood by the following description and will also be appreciated by the embodiments of the invention more clearly. Further, the objectives and advantages of the invention will readily be seen that they can be realized by the means and its combination specified in the claims.

BRIEF DESCRIPTION OF THE DRAWINGS

The above and other objects and features of the instant invention will become apparent from the following description of preferred embodiments taken in conjunction with the accompanying drawings, in which:

FIG. 19 is an exemplary truth table of the wireless communication terminal with the opening/closing sensing function using the magnetic pole sensors in accordance with the fifth embodiment of the present invention.

DETAILED DESCRIPTION OF THE INVENTION

The above-mentioned objectives, features, and advantages will be more apparent by the following detailed description in association with the accompanying drawings; and, according to this, the technical spirit of the invention will readily be conceived by those skilled in the art to which the invention belongs. Further, in the following description, well-known arts will be not described in detail if they would obscure the gist of the invention in unnecessary detail. Hereinafter, a preferred embodiment of the present invention will be described in detail with reference to the accompanying drawings.

Figure 1:
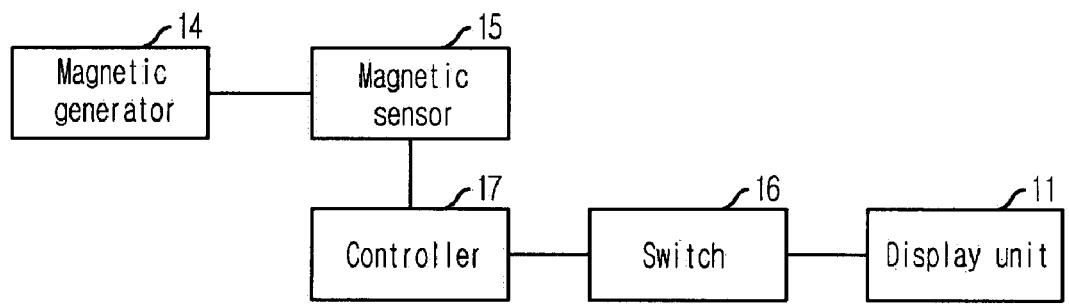
FIG. 1 is a configuration diagram showing an embodiment of a conventional wireless communication terminal with an opening/closing sensing function using a single magnetic sensor.
Figure 2:
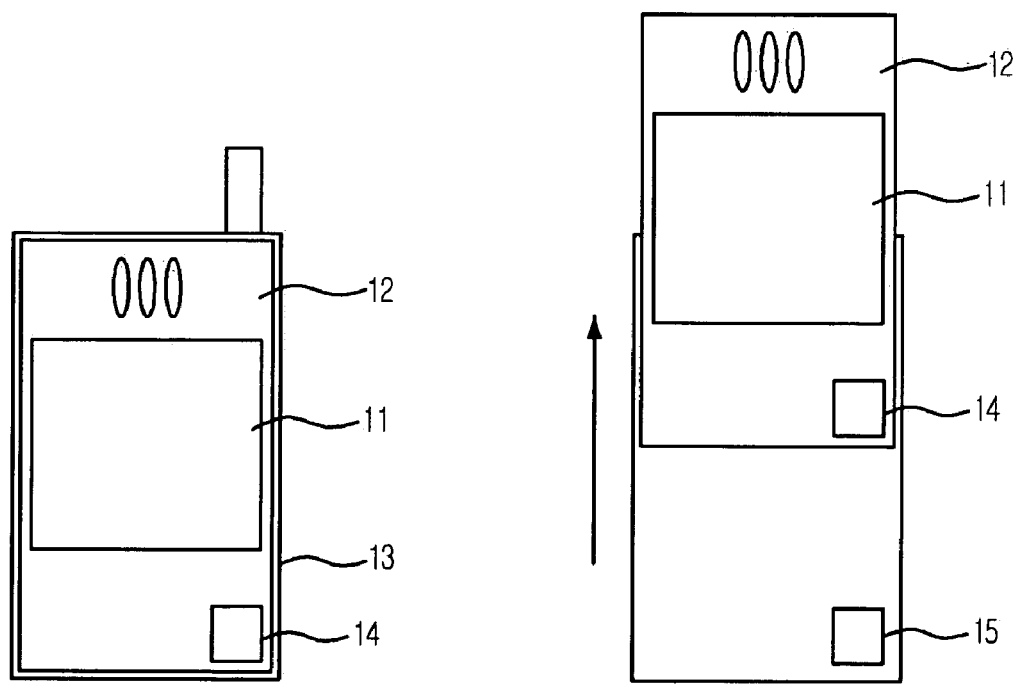
FIG. 2 is a perspective view showing the embodiment of the conventional wireless communication terminal with the opening/closing sensing function using the single magnetic sensor.
Figures 3, 4:
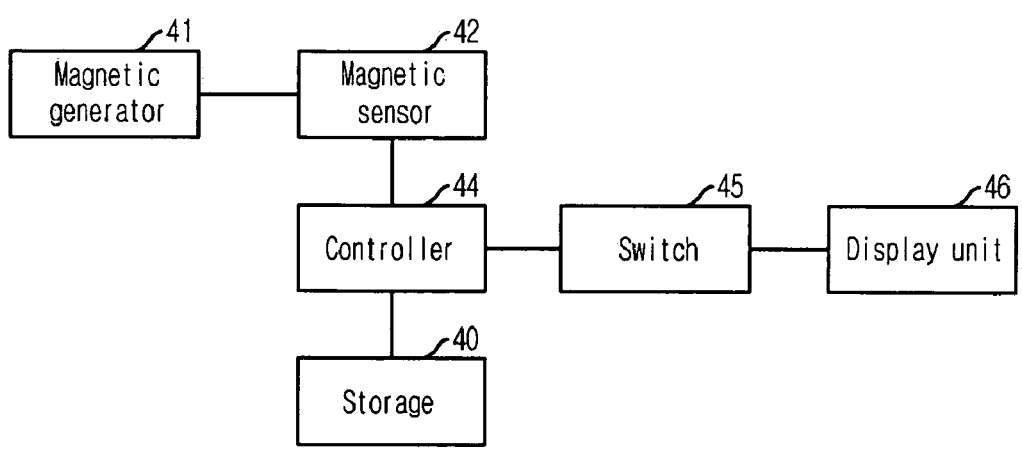
FIG. 3 is a truth table showing the embodiment of the conventional wireless communication terminal with the opening/closing sensing function using the single magnetic sensor.
FIG. 4 is an exemplary configuration diagram of a wireless communication terminal with an opening/closing sensing function using a plurality of magnetic sensors in accordance with a first embodiment of the present invention.

FIG. 4 is an exemplary configuration diagram of a wireless communication terminal with an opening/closing sensing function using a plurality of magnetic sensors in accordance with a first embodiment of the present invention;

As shown, the wireless communication terminal having a magnetic sensor to sense opening/closing includes a storage 40, a magnetic force generator 41, a magnetic sensor 42, a controller 44, a switch 45, and a display unit 46. The storage 40 stores a first threshold magnetic force used in determining an opening time point of a sub-body 47 and a second threshold magnetic force used in determining a closing time point of the sub-body 47. The magnetic force generator 41 generates magnetism. The magnetic sensor 42 senses the intensity of the magnetism, i.e., magnetic force, generated in the magnetic force generator 41. The controller 44 controls a switch 45 to activate or inactivate the display unit 46 based on the result of comparison between the magnetic force sensed in the magnetic sensor 42 and the first and second threshold magnetic forces. The switch 45 is switched according to a control signal transmitted from the controller 44. The display unit 46 is activated or inactivated according to the switching result of the switch 45.

Herein, the magnetic sensor 42 senses the intensity of the magnetism generated in the magnetic force generator 41 and transmits the magnetism intensity, i.e., magnetic force, to the controller. The magnetic sensor 42 includes a Hall Integrated Circuit (IC) and a Magneto-Resistive (MR) sensor.

Figures 5, 6:
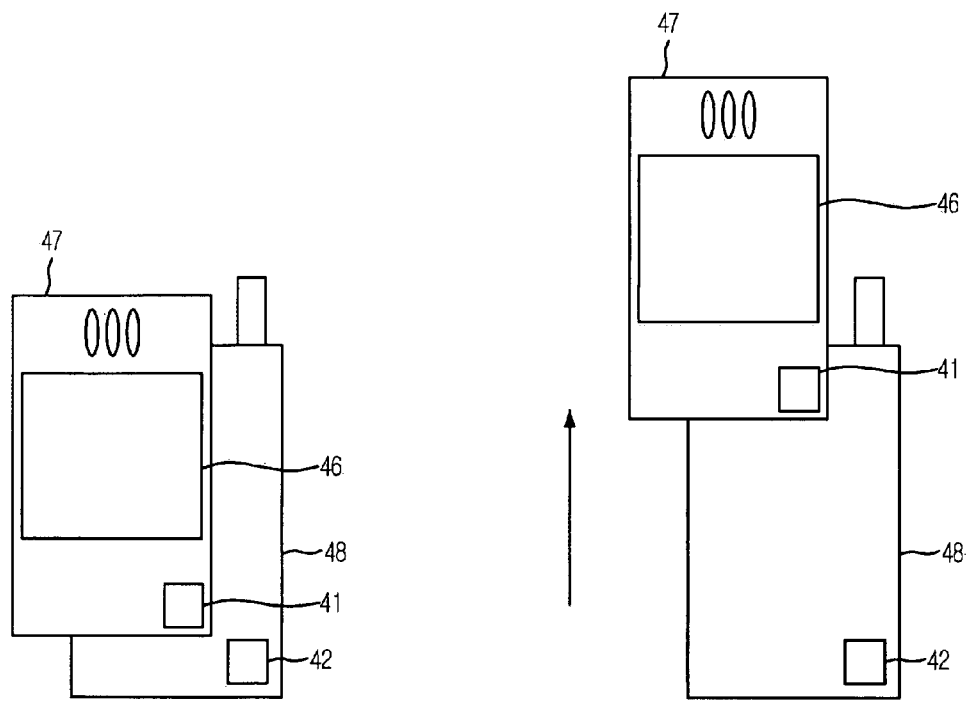
FIG. 5 is an exemplary perspective view of the wireless communication terminal with the opening/closing sensing function using the magnetic sensors in accordance with the first embodiment of the present invention.
FIG. 6 is an exemplary truth table of the wireless communication terminal with the opening/closing sensing function using the magnetic sensors in accordance with the first embodiment of the present invention.

The operation of the controller 44 will be described in detail with reference to FIG. 5. As illustrated in FIG. 5, the magnetic force generator 41 for generating magnetism is positioned in one side of the sub-body 47.

Also, the magnetic sensor 42, which is positioned in one side of the lower part of a main body 48, senses a magnetic force generated in the magnetic force generator 41 and transmits the magnetic force to the controller 44. The magnetic sensor 42 senses the magnetic force generated in the magnetic force generator 41 positioned in the sub-body 47 regardless of whether the sub-body 47 is open or closed. As the distance between the magnetic sensor 42 and the magnetic force generator 41 is shorter, the magnetic sensor 42 senses a stronger magnetic force.

The controller 44 compares the magnetic force sensed in the magnetic sensor 42 with a first threshold magnetic force stored in the storage 40 and, if the magnetic force exceeds the first threshold magnetic force, it senses that the sub-body 47 is closed. Accordingly, the controller 44 controls the switch 45 to inactivate the display unit 46.

Meanwhile, when the magnetic force does not exceed the first threshold magnetic force, the controller 44 compares the magnetic force sensed in the magnetic sensor 42 with a second threshold magnetic force stored in the storage 40. If the magnetic force does not exceed the second threshold magnetic force, it senses that the sub-body 47 is open. Accordingly, the controller 44 controls the switch 45 to activate the display unit 46.

When the magnetic force does not exceeds the first threshold magnetic force but exceeds the second threshold magnetic force, that is, when the magnetic force is between the first threshold magnetic force and the second threshold magnetic force, the controller 44 maintains the switch 45 and the display unit 46 in a current state.

Herein, when the controller 44 activates the display unit 46, it also performs a function of making a communication connection when the sub-body 47 is open to receive a call (including activation of a keypad and a speech output unit) and a waiting function (including activation of the keypad and the speech output unit) when the sub-body 47 is open to make a call. When the controller 44 inactivates the display unit 46, it also performs a function of shutting off a communication connection when the sub-body 47 is closed to terminate a call (including inactivation of the keypad and the speech output unit).

Meanwhile, the magnetic sensor 42 can sense the opening/closing of the sub-body 47 by measuring time for sensing a magnetic force exceeding the first threshold magnetic force or time for sensing a magnetic force not exceeding the second threshold magnetic force in the present invention. Herein, the storage 40 stores the threshold times.

The sensing of opening/shutting will be described more in detail with reference to FIG. 6.

First, when the sub-body 47 is closed, the magnetic sensor 42 senses a magnetic force exceeding the first threshold magnetic force. While the sub-body 47 becomes open, the magnetic sensor 42 becomes apart from the magnetic force generator 41 positioned in the sub-body 47 and senses a magnetic force smaller than the first threshold magnetic force.

The sub-body 47 is completely open as the distance between the magnetic force generator 41 and the magnetic sensor 42 becomes longer. Then, the magnetic sensor 42 measures time taken for sensing the magnetic force smaller than the second magnetic force and, if the measured time satisfies a predetermined threshold time condition, it senses that the sub-body 47 is open.

Also, when the sub-body 47 is open, the magnetic sensor 42 senses a magnetic force smaller than the second threshold magnetic force. Then, while the sub-body 47 becomes closed, the distance between the magnetic sensor 42 and the magnetic force generator 41 positioned in the sub-body 47 becomes short. Then, the magnetic sensor 42 senses a magnetic force exceeding the second threshold magnetic force.

The distance becomes shorter until the sub-body 47 is completely closed. Then, the magnetic sensor 42 measures time for sensing a magnetic force exceeding the first threshold magnetic force. When the measured time satisfies a predetermined threshold time condition, it senses that the sub-body 47 is closed.

Meanwhile, the aforementioned operation can be carried out by positioning the magnetic force generator 41 in a main body 48 and the magnetic sensor 42 in a sub-body 48.

Figure 7:
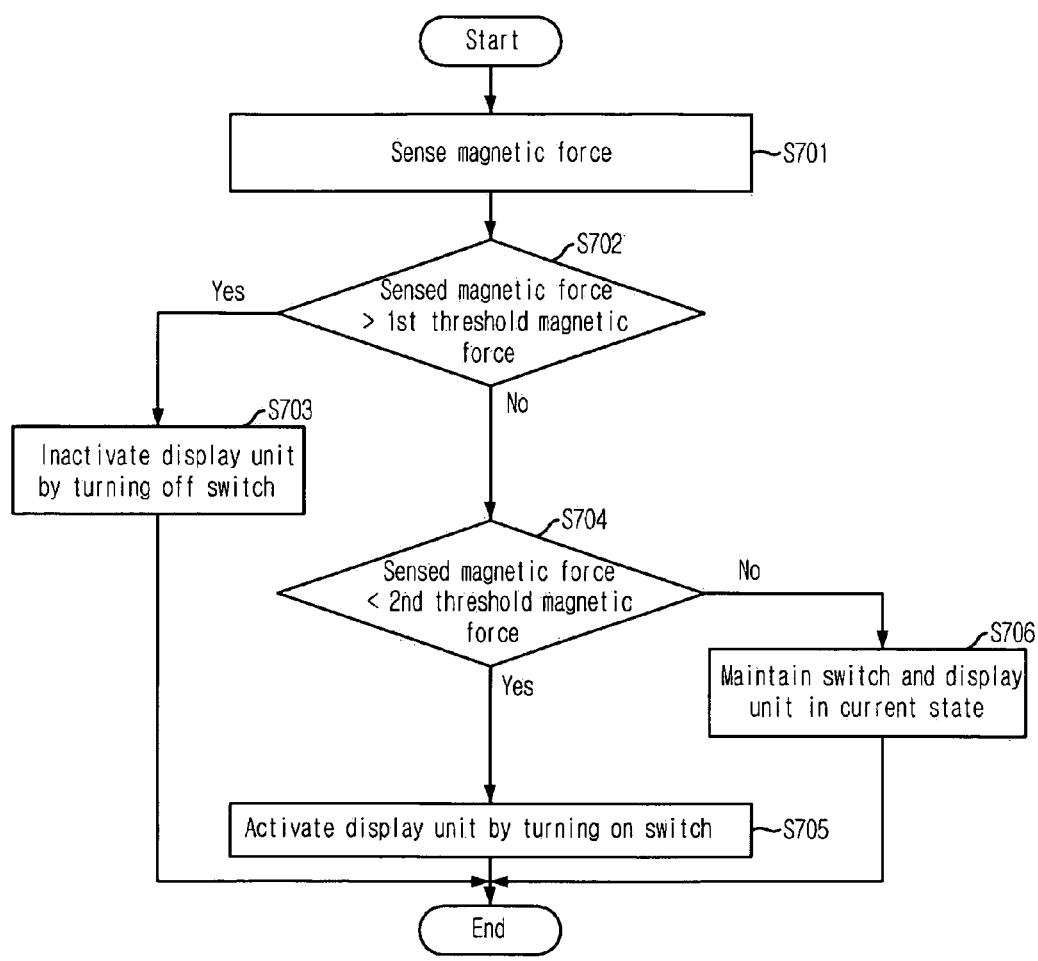
FIG. 7 is an exemplary flowchart of an opening/closing sensing method using the magnetic sensors in the wireless communication terminal in accordance with the first embodiment of the present invention.

FIG. 7 is an exemplary flowchart of an opening/closing sensing method using the magnetic sensors in the wireless communication terminal in accordance with the first embodiment of the present invention.

First, at step S701, a magnetic sensor senses the intensity of a magnetic force, i.e., a magnetic force. At step S702, it is checked whether the sensed magnetic force exceeds the first threshold magnetic force stored in the storage 40.

When the sensed magnetic force turns out to exceed the first threshold magnetic force, at step S703, the controller 44 determines that the sub-body 47 is closed, turns the switch 45 off, and inactivate the display unit 46.

Otherwise, when the sensed magnetic force turns out not to exceed the first threshold magnetic force, at step S704, it is checked whether the sensed magnetic force exceeds the second threshold magnetic force.

When the sensed magnetic force turns out to exceed the second threshold magnetic force, at step S705, the controller 44 determines that the sub-body 47 is open, turns the switch 45 on, and activate the display unit 46.

When the sensed magnetic force turns out to exceed the second threshold magnetic force, at step S706, the switch and the display unit remain in the current state.

Figure 8:
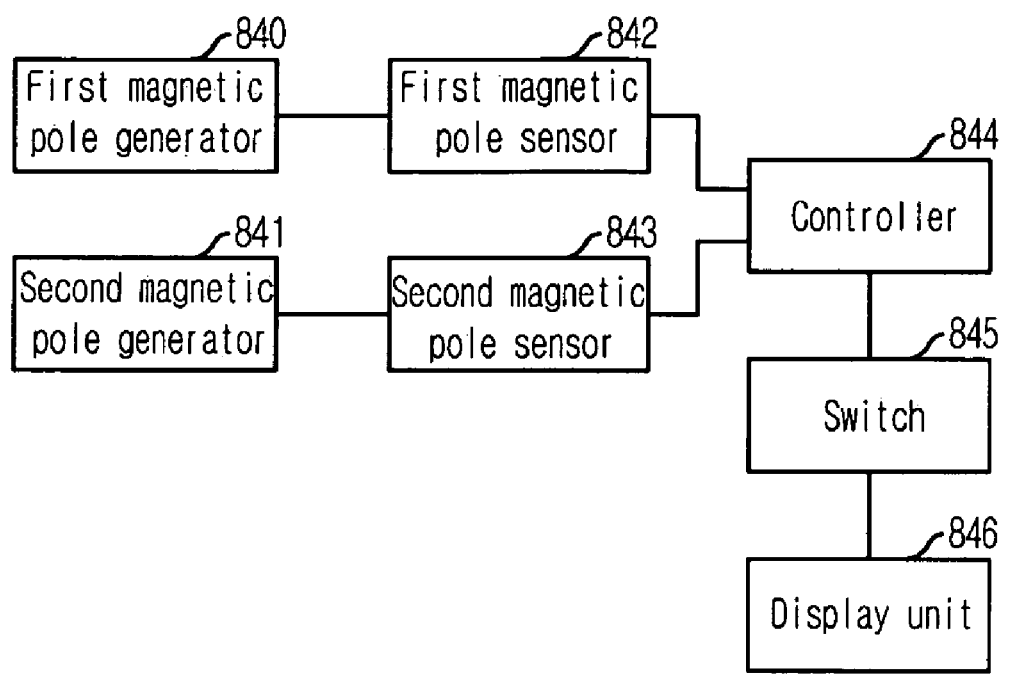
FIG. 8 is an exemplary configuration diagram of a wireless communication terminal with an opening/closing sensing function using a plurality of magnetic pole sensors in accordance with a second embodiment of the present invention.

FIG. 8 is an exemplary configuration diagram of a wireless communication terminal with an opening/closing sensing function using a plurality of magnetic pole sensors in accordance with a second embodiment of the present invention.

As illustrated in FIG. 8, the inventive wireless communication terminal with the opening/closing sensing function using the magnetic pole sensors comprises a first magnetic pole generator 840 for generating a north (N) magnetic pole, a second magnetic pole generator 841 for generating a south (S) magnetic pole, a first magnetic pole sensor 842 for sensing the N magnetic pole from the first magnetic pole generator 840, a second magnetic pole sensor 843 for sensing the S magnetic pole from the second magnetic pole generator 841, a controller 844 for controlling an operation of a switch 845 to activate or inactivate a display unit 846 based on the magnetic pole sense result from the first and second magnetic pole sensors 842 and 843, the switch 845 that performs a switching operation in response to a control signal from the controller 844, and the display unit 846 that is activated or inactivated according to the switching operation of the switch 845.

In the foregoing, when each magnetic pole sensor senses the N or S magnetic pole, it outputs a sense signal (or on signal), while, when each magnetic pole sensor does not sense each of the N and S magnetic poles, it outputs a non-sense signal (or off signal). For example, each magnetic pole sensor may be comprised of hall IC (integrated circuit), MR (magneto-resistive) sensor, etc.

Now, an operation of the controller 844 in accordance with the second embodiment of the present invention will be described in more detail with reference to FIG. 9.

Figures 9, 10:
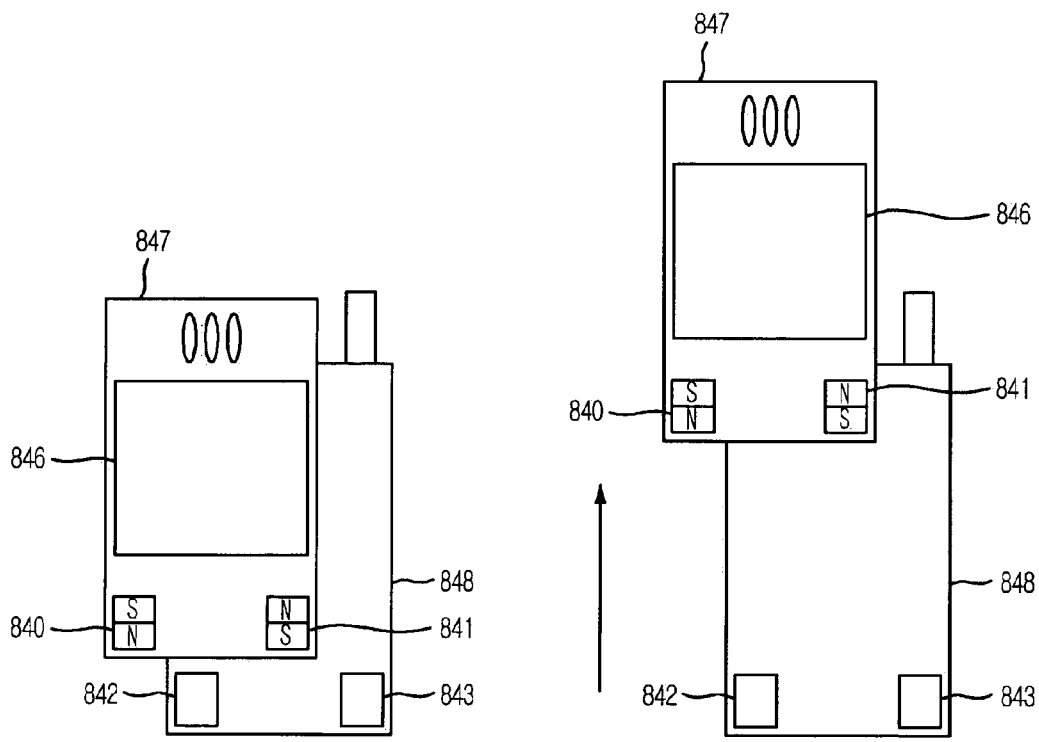
FIG. 9 is an exemplary perspective view of the wireless communication terminal with the opening/closing sensing function using the magnetic pole sensors in accordance with the second embodiment of the present invention.
FIG. 10 is an exemplary truth table of the wireless communication terminal with the opening/closing sensing function using the magnetic pole sensors in accordance with the second embodiment of the present invention.

As shown in FIG. 9, the first and the second magnetic pole generators 840 and 841 for generating N and S magnetic poles are placed on one side of a sub-body 847, respectively. And, the first magnetic pole sensor 842 is placed on one side of the lower end of a main body 848, i.e., at a location where it can sense the N magnetic pole from the first magnetic pole generator 840 in case that the sub-body 847 is closed.

Further, the second magnetic pole sensor 843 is placed on another side of the bottom of the main body 848, i.e., at a location where it can sense the S magnetic pole from the second magnetic pole generator 841 in case that the sub-body 847 is closed.

According to this configuration, in case that the sub-body 847 is closed, the first and the second magnetic pole sensors 842 and 843 sense the N and S magnetic poles from the first and the second magnetic pole generators 840 and 841, respectively. When the magnetic poles are sensed, each sensor provides a sense signal to the controller 844.

After providing the sense signals, if the controller 844 receives the sense signals from the first and the second magnetic pole sensors 842 and 843, it determines the sub-body 847 to be closed and then makes the switch 845 turned off, thereby deactivating the display unit 846.

In contrast, in case that the sub-body 847 is open, the first and the second magnetic pole sensors 842 and 843 can't sense the N and S magnetic poles from the first and the second magnetic pole generators 840 and 841, respectively. In this case, each sensor provides a non-sense signal to the controller 844.

After that, if the controller 844 receives the non-sense signals from the first and the second magnetic pole sensors 842 and 843, it determines the sub-body 847 to be open and then makes the switch 845 turned on, activating the display unit 846.

In the foregoing, while the controller 844 activates the display unit 846, it performs, in case that the sub-body 847 is open to receive a call, a function of connecting a call path and a stand-by function for making a telephone, including an activation of a key pad and a voice output unit. Further, while the controller 844 inactivates the display unit 846, it conducts, in case that the sub-body 847 is closed to end a call, a function of disconnecting the call path, including a deactivation of the key pad and voice output unit.

Now, with regard to the opening and closing of the sub-body 847 in accordance with the second embodiment of the present invention, an operation of each element will be described in more detail with reference to FIG. 10.

Firstly, as set forth above, the normal operation of the wireless communication terminal is done in such a way that, in a state that the sub-body 847 is closed, if the first and the second magnetic pole sensors 842 and 843 sense the N and S magnetic poles from the first and the second magnetic pole generators 840 and 841, respectively, the switch 845 is turned off, thereby deactivating the display unit 846. In contrast, it is operated in such a manner that, in a state that the sub-body 847 is open, if the first and the second magnetic pole sensors 842 and 843 do not sense the N and S magnetic poles from the first and the second magnetic pole generators 840 and 841, respectively, the switch 845 is turned on, activating the display unit 846.

In the above process, in the state that the sub-body 847 is open or closed, owing to any magnetic pole caused by an external magnetic pole generation means, if the first magnetic pole sensor 842 senses the N magnetic pole while the second magnetic pole sensor 843 does not sense the S magnetic pole, or the first magnetic pole sensor 842 does not sense the N magnetic pole while the second magnetic pole sensor 843 senses the S magnetic pole, the controller 844 is allowed to maintain the previous state of the switch 845 and the display unit 846.

Namely, in a state that, in the close case of the sub-body 847, the switch 845 is turned off and the display unit 846 is inactivated since the first and the second magnetic pole sensors 842 and 843 sense the N and S magnetic poles from the first and the second magnetic pole generators 840 and 841 respectively, if any one of the first and the second magnetic pole sensors 842 and 843 does not sense the magnetic pole due to any defect from the outside, the controller 844 maintains the current state, i.e., the turn-off state of the switch 845 followed by the deactivation state of the display unit 846.

Also, in a state that, in the open case of the sub-body 847, the switch 845 is turned on and the display unit 846 is activated since the first and the second magnetic pole sensors 842 and 843 do not sense the N and S magnetic poles from the first and the second magnetic pole generators 840 and 841 respectively, if any one of the first and the second magnetic pole sensors 842 and 843 senses the magnetic pole due to any magnetic pole from the outside, the controller 844 maintains the current state, i.e., the turn-on state of the switch 845 followed by the activation state of the display unit 846.

Meanwhile, it may be implemented such that the present invention can perform the same operation as set forth above by disposing the first and the second magnetic pole generators 840 and 841 in the main body 848, and the first and the second magnetic pole sensors 842 and 843 in the sub-body 847.

Figure 11:
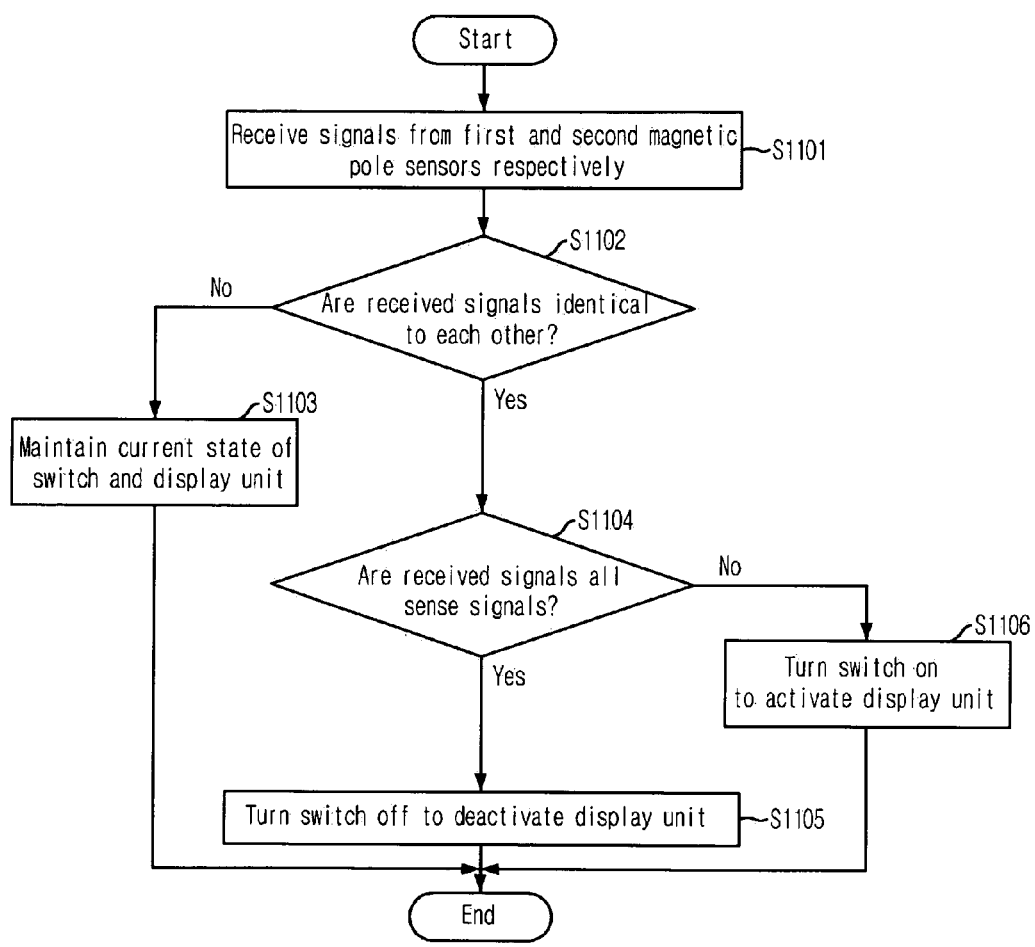
FIG. 11 is an exemplary flowchart of an opening/closing sensing method using the magnetic pole sensors in the wireless communication terminal in accordance with the second embodiment of the present invention.

Turning now to FIG. 11, there is shown an exemplary flowchart illustrating an opening/closing sensing method using the magnetic pole sensors in the wireless communication terminal in accordance with the second embodiment of the invention.

At a first step S1101, the inventive process receives signals from the first and the second magnetic pole sensors 842 and 843, respectively.

At a next step S1102, the process confirms whether or not the received signals are all identical to one another.

In the confirmation process at step S1102, if the received signals are not identical, i.e., if one of the received signals is a sense signal and the other is a non-sense signal, the process motivates the switch 845 and the display unit 846 to be maintained in the current state at step S1103.

Conversely, if the received signals are identical, the process again confirms at step S1104 whether or not the signals are all sense signals.

From the confirmation process of step S1104, if the received signals are all the sense ones, i.e., if the signals from the first and the second magnetic pole sensors 842 and 843 are all the sense ones, at step S1105 the process causes the switch 45 to be turned off and then the display unit 846 to be inactivated.

However, from the confirmation result at step S1104, if the received signals are all the non-sense ones, i.e., if the signals from the first and the second magnetic pole sensors 842 and 843 are all the non-sense ones, at step S1106 the process prompts the switch 845 to be turned on and in turn the display unit 846 to be activated.

Hereinafter, a configuration of a wireless communication terminal with an opening/closing sensing function using a multiplicity of magnetic pole sensors in accordance with a third embodiment of the invention will be given.

Figure 12:
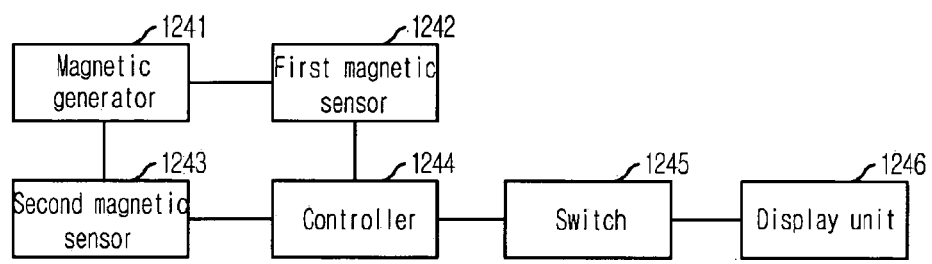
FIG. 12 is an exemplary configuration diagram of a wireless communication terminal with an opening/closing sensing function using a plurality of magnetic sensors in accordance with a third embodiment of the present invention.

FIG. 12 shows a configuration of a wireless communication terminal with an opening/closing sensing function using a multiplicity of magnetic sensors in accordance with a third embodiment of the invention.

As shown in FIG. 12, the inventive wireless communication terminal with the opening/closing sensing function using the magnetic sensors comprises a magnetic generator 1241 for generating a magnetic, a first magnetic sensor 1242 for sensing the magnetic from the magnetic generator 1241, a second magnetic sensor 1243 for sensing the magnetic from the magnetic generator 1241, a controller 1244 for controlling an operation of a switch 1245 to activate or activate a display unit 1246 based on the magnetic sense result from the first and second magnetic sensors 1242 and 1243, the switch 1245 that performs a switching operation in response to a control signal from the controller 1244, and the display unit 1246 activated or inactivated according to the switching result of the switch 1245.

In the foregoing, when each magnetic sensor senses a magnetic, it outputs a sense signal (or on signal), while, when each magnetic sensor does not sense the magnetic, it outputs a non-sense signal (or off signal). For example, each magnetic sensor may be comprised of hall IC, MR sensor, etc.

Now, an operation of the controller 1244 in accordance with the third embodiment of the present invention will be described in more detail with reference to FIG. 13.

Figures 13, 14:
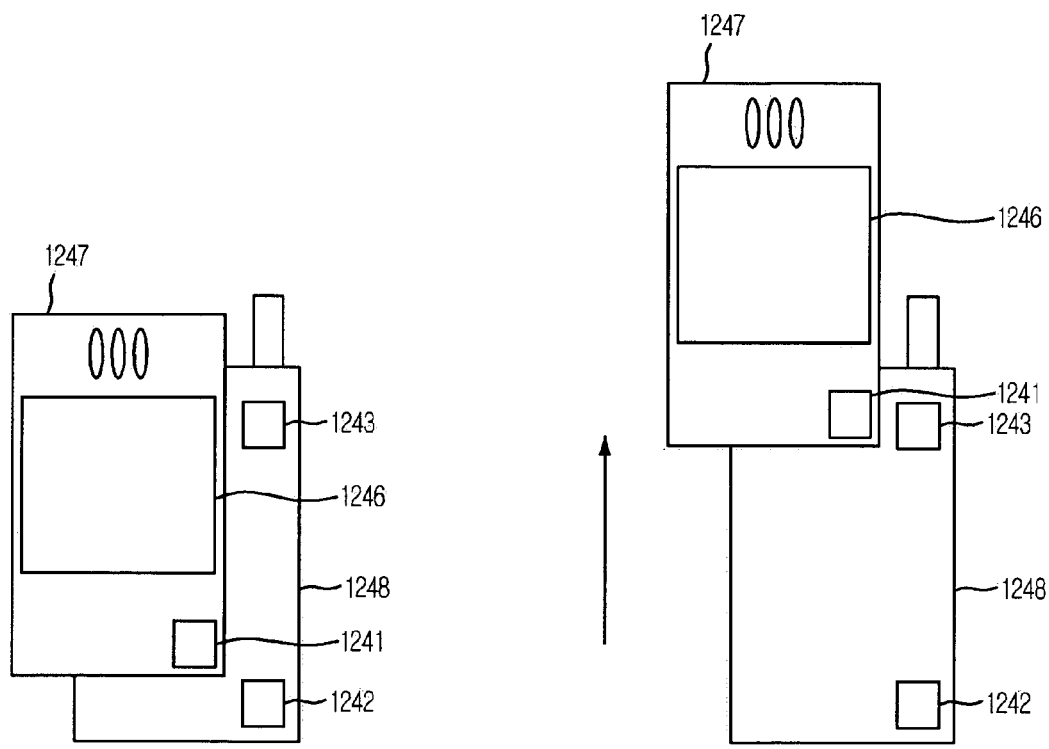
FIG. 13 is an exemplary perspective view of the wireless communication terminal with the opening/closing sensing function using the magnetic sensors in accordance with the third embodiment of the present invention.
FIG. 14 is an exemplary truth table of the wireless communication terminal with the opening/closing sensing function using the magnetic sensors in accordance with the third embodiment of the present invention.

As shown in FIG. 13, the magnetic generator 1241 for generating a magnetic is placed on one side of a sub-body 1247. And, the first magnetic sensor 1242 is placed on one side of the lower end of a main body 1248, i.e., at a location where it can sense the magnetic from the magnetic generator 1241 in case that the sub-body 1247 is closed.

Further, the second magnetic sensor 1243 is placed on one side of the upper end of the main body 1248, i.e., at a location where it can sense the magnetic from the magnetic generator 1241 in case that the sub-body 47 is open.

According to this configuration, in case that the sub-body 1247 is closed, the first magnetic sensor 1242 senses the magnetic from the magnetic generator 1241 and then provides a sense signal to the controller 1244, while the second magnetic sensor 1243 does not sense the magnetic from the magnetic generator 1241 and then provides a non-sense signal to the controller 1244.

After that, if the controller 1244 receives the sense signal from the first magnetic sensor 1242 and the non-sense signal from the second magnetic sensor 1243, it determines the sub-body 1247 to be closed and then makes the switch 1245 turned off, thereby deactivating the display unit 1246.

In contrast, in case that the sub-body 1247 is open, the first magnetic sensor 1242 does not sense the magnetic from the magnetic generator 1241 and hence provides a non-sense signal to the controller 1244, whereas the second magnetic sensor 1242 senses the magnetic from the magnetic pole generator 1241 and hence provides a sense signal to the controller 1244.

Then, if the controller 1244 receives the non-sense signal from the first magnetic sensors 1242 and the sense signal from the second magnetic sensor 1243, it determines the sub-body 1247 to be open and then makes the switch 1245 turned on, thereby activating the display unit 1246.

In the process, while the controller 1244 activates the display unit 1246, it performs, in case that the sub-body 1247 is open to receive a call, a function of connecting a call path and a stand-by function for making a telephone, including an activation of a key pad and a voice output unit. Further, while the controller 1244 inactivates the display unit 1246, it conducts, in case that the sub-body 1247 is closed to end the call, a function of disconnecting the call path, including a deactivation of the key pad and voice output unit.

Now, with regard to the opening and closing of the sub-body 1247 in accordance with the third embodiment of the present invention, an operation of each element will be described in more detail with reference to FIG. 14.

First of all, as set forth above, the normal operation of the wireless communication terminal is done in such a way that, in a state that the sub-body 1247 is closed, if the first magnetic sensor 1242 sense the magnetic and the second magnetic sensor 1243 does not sense the magnetic, the switch 1245 is turned off and in turn the display unit 1246 is inactivated. In contrast, it is operated in such a manner that, in case that the sub-body 1247 is open, if the first magnetic sensor 1242 does not sense the magnetic and the second magnetic sensor 1243 senses the magnetic, the switch 1245 is turned on and hence the display unit 1246 is activated.

In the above process, in the state that the sub-body 1247 is open or closed, if both first and second magnetic sensors 1242 and 1243 sense the magnetic owing to any magnetic caused by an external magnetic generation means, or if both sensors 1242 and 1243 do not sense the magnetic due to a cancellation of the magnetic from the magnetic generator 1241 and the magnetic caused by the external magnetic generation means, the controller 1244 is permitted to maintain the previous state of the switch 1245 and the display unit 1246.

In other words, in a state that, in the close case of the sub-body 1247, the switch 1245 is turned off and the display unit 1246 is inactivated because the first magnetic sensor 1242 senses the magnetic and the second magnetic sensor 1243 does not sense the magnetic, if the second magnetic sensor 1243 senses the magnetic due to any magnetic from the outside, the controller 1244 maintains the current state, i.e., the turn-off state of the switch 1245 followed by the deactivation state of the display unit 1246.

Also, in a state that, in the open case of the sub-body 1247, the switch 1245 is turned on and the display unit 1246 is activated because the first magnetic sensor 1242 does not sense the magnetic and the second magnetic sensor 1243 senses the magnetic, if the second magnetic sensor 1243 does not sense the magnetic, the controller 1244 maintains the current state, i.e., the turn-on state of the switch 1245 followed by the activation state of the display unit 1246.

Meanwhile, it may be implemented such that the present invention can perform the same operation as set forth above by disposing the magnetic generator 1241 in the main body 1248, and the first and the second magnetic sensors 1242 and 1243 in the sub-body 1247.

Figure 15:
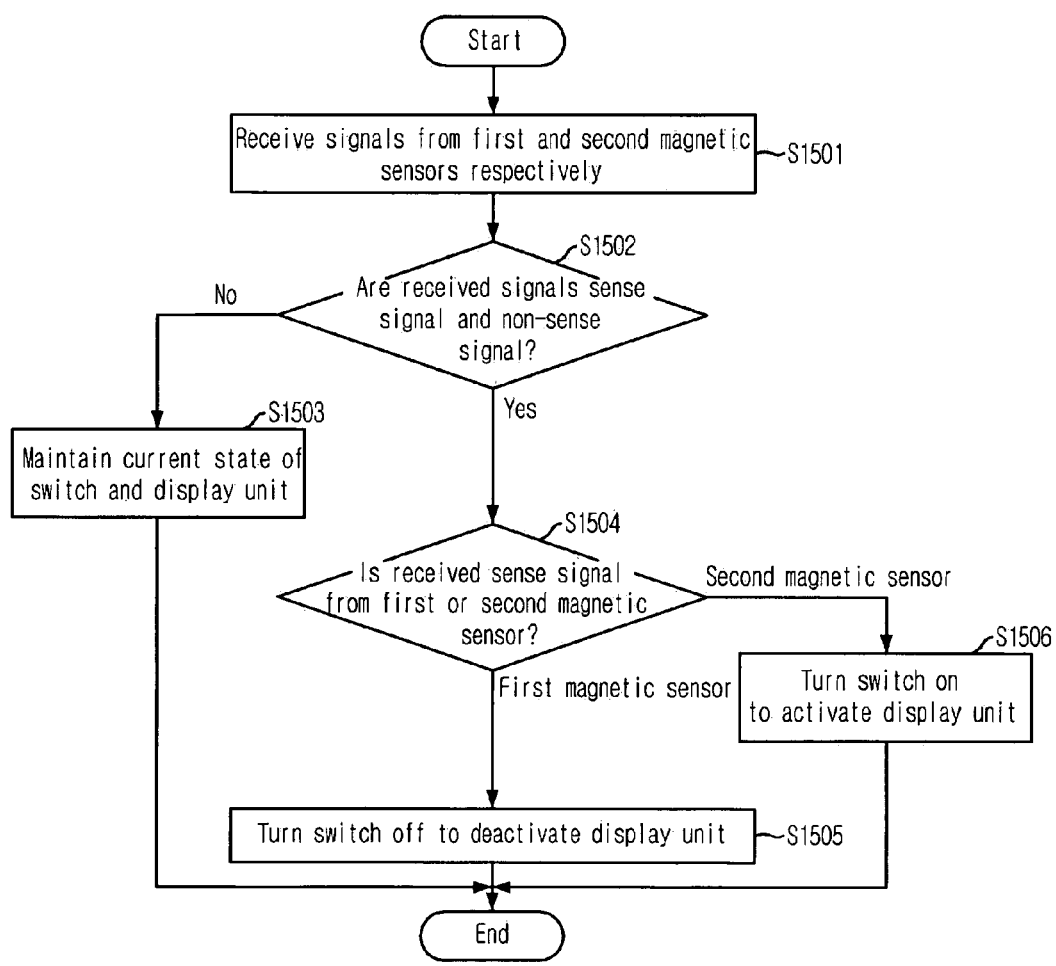
FIG. 15 is an exemplary flowchart of an opening/closing sensing method using the magnetic sensors in the wireless communication terminal in accordance with the third embodiment of the present invention.

Turing now to FIG. 15, there is shown a flowchart illustrating an opening/closing sensing method using the magnetic sensors in the wireless communication terminal in accordance with the third embodiment of the invention.

At a first step S1501, the inventive process receives signals from the first and the second magnetic sensors 1242 and 1243, respectively.

At a next step S1502, the process confirms whether or not one of the received signals is a sense signal and the other is a non-sense signal.

If the confirmation result at step S1502 indicates that it is not the case that one of the received signals is the sense signal and the other is the non-sense signal, i.e., if both received signals are all sense ones or all non-sense ones, the process causes the switch 1245 and the display unit 1246 to be maintained in the current state at step S1503.

In the meantime, from the confirmation at step S1502, if one of the received signals is the sense signal and the other is the non-sense signal, the process again confirms at step S1504 whether or not the received sense signal is from the first magnetic sensor 1242 or the second magnetic sensor 1243.

In the confirmation process of step S1504, if the sense signal is from the first magnetic sensor 1242 and the non-sense signal is from the second magnetic sensor 1243, at step S1505 the process prompts the switch 1245 to be turned off and then the display unit 1246 to be inactivated.

Conversely, in the confirmation process of step S1504, if the non-sense signal is from the first magnetic sensor 1242 and the sense signal is from the second magnetic sensor 1243, at step S1506 the process motivates the switch 1245 to be turned on and then the display unit 1246 to be activated.

Hereinafter, a wireless communication terminal having a plurality of magnetic pole sensors to sense opening/closing in accordance with a fourth embodiment of the present invention will be described with reference to FIGS. 12 to 14 and FIG. 16. Description on FIGS. 12 to 14 will be omitted herein.

Figure 16:
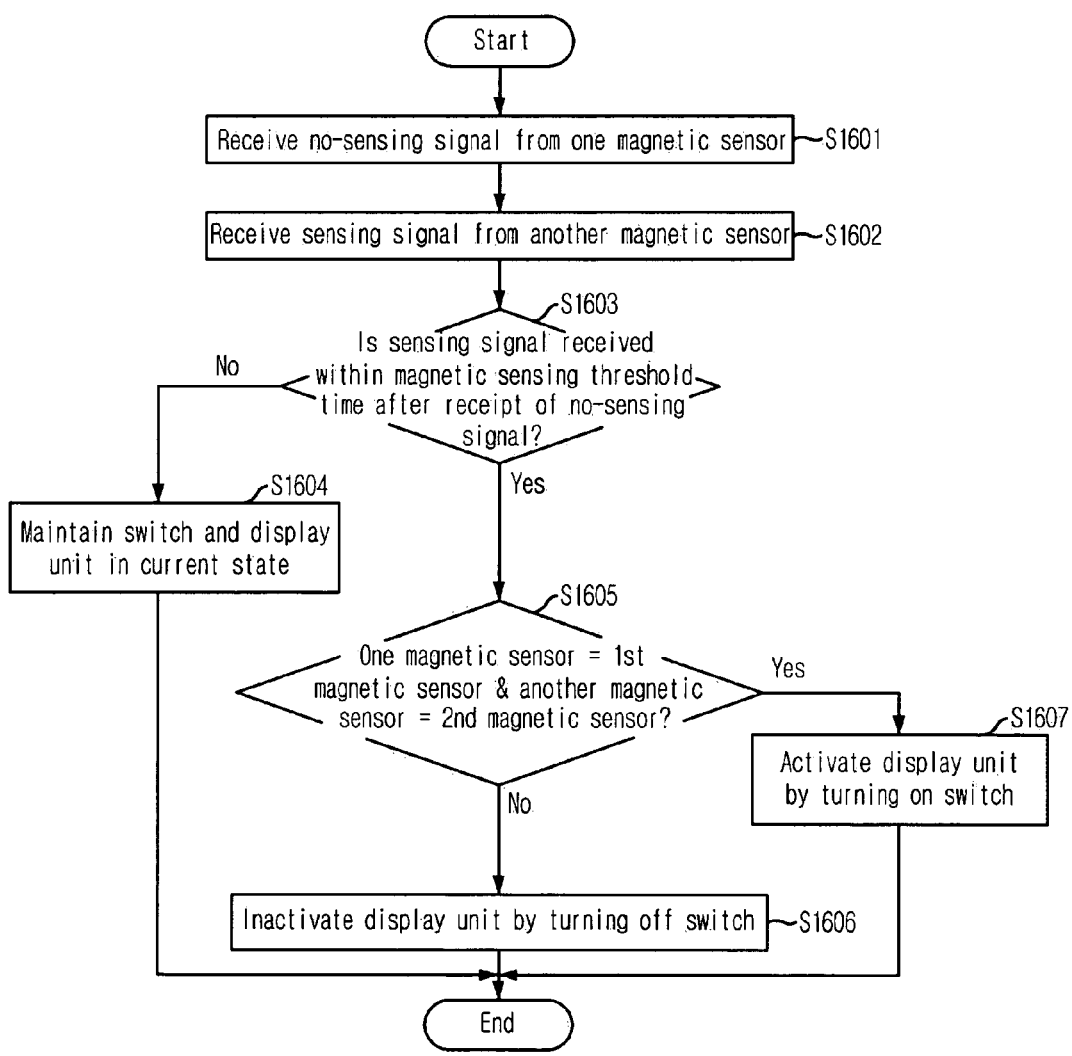
FIG. 16 is an exemplary flowchart of an opening/closing sensing method using the magnetic sensors in the wireless communication terminal in accordance with the fourth embodiment of the present invention.

FIG. 16 is an exemplary flowchart of an opening/closing sensing method using the magnetic sensors in the wireless communication terminal in accordance with the fourth embodiment of the present invention.

First, at step S1601, a no-sensing signal is transmitted from one magnetic sensor. At step S1602, a sensing signal is transmitted from another magnetic sensor. At step S1603, it is checked whether the sensing signal is received within a magnetism sensing threshold time after receipt of the no-sensing signal.

If the sensing signal is not received within the magnetism sensing threshold time at the step S1603, at step S1604, the switch and the display unit 1246 remain in the current state.

Otherwise, if the sensing signal is received within the magnetism sensing threshold time at the step S1603, at step S1605, it is determined whether one magnetic sensor is a first magnetic sensor 1242 and another magnetic sensor is a second magnetic sensor 1243.

When it is determined that one magnetic sensor is the first magnetic sensor 1242 and another magnetic sensor is the second magnetic sensor 1243, at step S1606, the controller determines that the sub-body 1247 is closed, turns the switch on, and activates the display unit 1246.

Otherwise, when it is determined that one magnetic sensor is the second magnetic sensor 1243 and another magnetic sensor is the first magnetic sensor 1242, at step S1605, the controller determines that the sub-body 1247 is open, turns the switch off, and inactivates the display unit 1246.

Hereinafter, a configuration of a wireless communication terminal with an opening/closing sensing function using a plurality of magnetic pole sensors in accordance with a fifth embodiment of the invention will be given.

Figure 17:
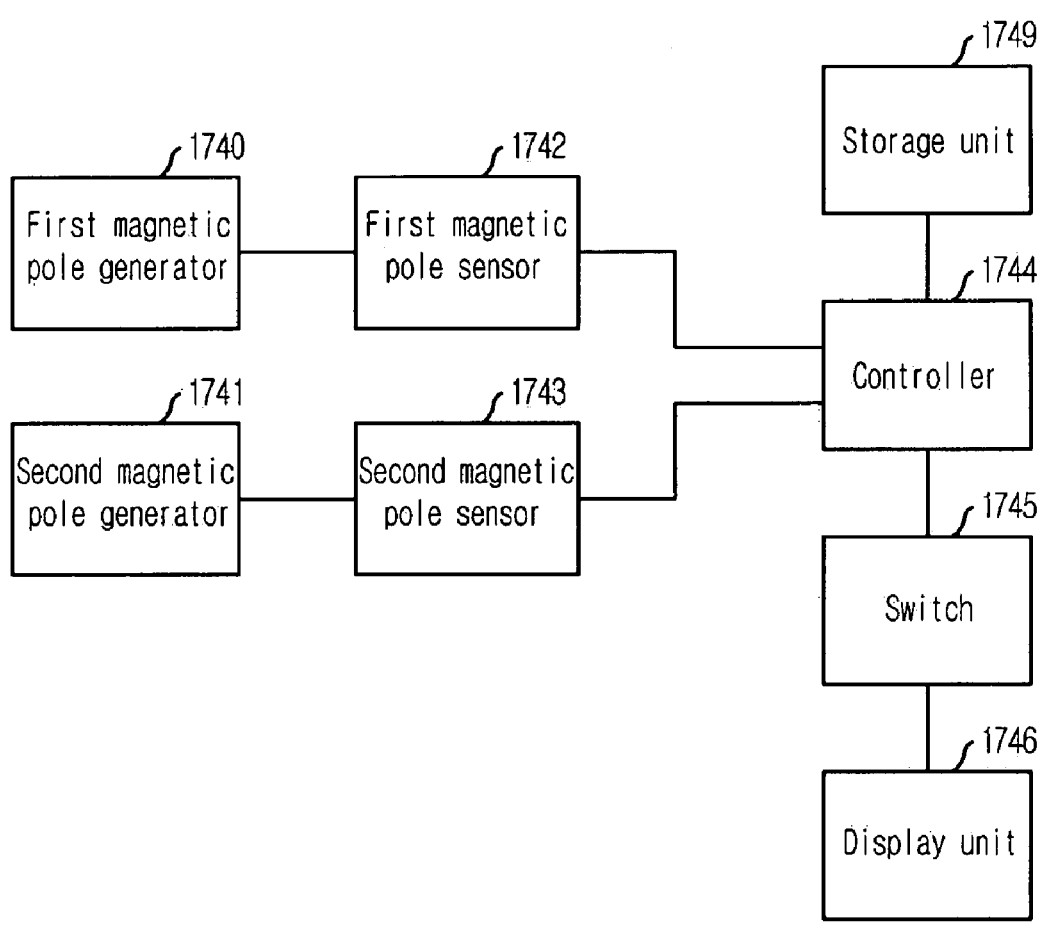
FIG. 17 is an exemplary configuration diagram of a wireless communication terminal with an opening/closing sensing function using a plurality of magnetic pole sensors in accordance with a fifth embodiment of the present invention.

FIG. 17 shows a configuration of a wireless communication terminal with an opening/closing sensing function using a plurality of magnetic pole sensors in accordance with a fifth embodiment of the invention.

As shown in FIG. 17, the inventive wireless communication terminal with the opening/closing sensing function using the magnetic pole sensors comprises a storage unit 1749 for storing magnetic pole sense time interval information, a first magnetic pole generator 1740 for generating an N magnetic pole, a second magnetic pole generator 1741 for generating an S magnetic pole, a first magnetic pole sensor 1742 for sensing the N magnetic pole from the first magnetic pole generator 1740, a second magnetic pole sensor 1743 for sensing the S magnetic pole from the second magnetic pole generator 1741, a controller 1744 for controlling an operation of a switch 1745 to activate or inactivate a display unit 1746 by sensing an opening/closing of a sub-body on the basis of the magnetic pole sense time interval information stored in the storage unit 1749 when the magnetic poles are sensed by the first and the second magnetic pole sensors 1742 and 1743, the switch 1745 that performs a switching operation in response to a control signal from the controller 1744, and the display unit 1746 that is activated or inactivated according to the switching result of the switch 1745.

The term "magnetic pole sense time interval information" stored in the storage unit 1749 implies information on a time interval between processes for the first and the second magnetic pole sensors 1742 and 1743 to sense the magnetic poles from the first and the second magnetic pole generators 1740 and 1741, respectively.

That is, in the fifth embodiment of the invention, when a sub-body 1747 is closed from an open state thereof, the first magnetic pole sensor 1742 senses the N magnetic pole from the first magnetic pole generator 1740, and, after a constant time, the second magnetic pole sensor 1743 senses the S magnetic pole from the second magnetic pole generator 1741. In such a case, information on the time interval between the processes in the sensors 1742 and 1743 is called the magnetic pole sense time interval information.

Similarly, when the sub-body 1747 is open from a close state thereof, the second magnetic pole sensor 1743 does not sense the S magnetic pole from the second magnetic pole generator 1741, and, after a constant time, the first magnetic pole sensor 1742 does not sense the N magnetic pole from the first magnetic pole generator 1740. In this case, information on the time interval between the processes in the sensors 1743 and 1742 is also called the magnetic pole sensing time interval information.

In the foregoing, when each magnetic pole sensor senses an N or S magnetic pole, it outputs a sense signal (or on signal), while, when each magnetic pole sensor does not sense any of the N and S magnetic poles, it outputs a non-sense signal (or off signal). For example, each magnetic pole sensor may be comprised of hall IC, MR sensor, etc.

Now, an operation of the controller 1744 in accordance with the fifth embodiment of the present invention will be described in more detail with reference to FIG. 18.

Figure 18:
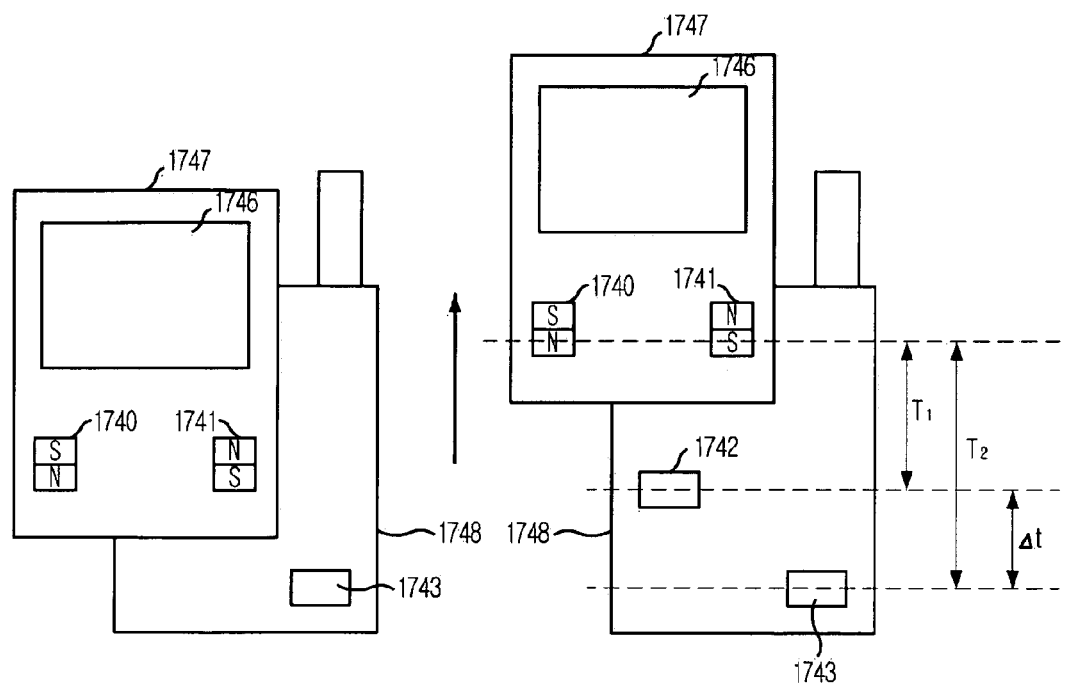
FIG. 18 is an exemplary perspective view of the wireless communication terminal with the opening/closing sensing function using the magnetic pole sensors in accordance with the fifth embodiment of the present invention.

As depicted in FIG. 18, the first and the second magnetic pole generators 1740 and 1741 for generating N and S magnetic poles are placed on one side of the sub-body 1747, respectively. The first magnetic pole sensor 1742 is placed on one side of a main body 1748, i.e., at a location where it can sense the N magnetic pole from the first magnetic pole generator 1740 before the second magnetic pole sensor 1743 senses the S magnetic pole from the second magnetic pole generator 1741 at a predefined time T2 in case that the sub-body 1747 is closed from an open state thereof.

The second magnetic pole sensor 1743 is placed on one side of the main body 1748, i.e., at a location where it can sense the S magnetic pole from the second magnetic pole generator 1741 after the first magnetic pole sensor 1742 senses the N magnetic pole from the first magnetic pole generator 1740 in case that the sub-body 1747 is closed from an open state thereof.

According to such a configuration, in case that the sub-body 1747 is closed from the open state thereof, the first magnetic pole sensor 1742 senses the N magnetic pole from the first magnetic pole generator 1740, and, after a constant time (Δt), the second magnetic pole sensor 1743 senses the S magnetic pole from the second magnetic pole generator 1741. At this time, each sensor provides a sense signal to the controller 1744, in which the first magnetic pole sensor 1742 provides the sense signal to the controller 1744, prior to doing so by the second magnetic pole sensor 1743.

After providing the sensing signals, if the controller 1744 receives the sense signal from the first magnetic pole sensor 1742, and, after the constant time, the sense signal from the second magnetic pole sensor 1743, it senses the closing of the sub-body 1747 and then prompts the switch 1745 to be turned off, thereby deactivating the display unit 1746.

Further, in case that the sub-body 1747 is open from a close state thereof, the second magnetic pole sensor 1743 does not sense the S magnetic pole from the second magnetic pole generator 1741, and, after the constant time (Δt), the first magnetic pole sensor 1742 does not sense the N magnetic pole from the first magnetic pole generator 1740. At this time, each sensor provides a non-sense signal to the controller 1744, wherein the second magnetic pole sensor 1743 delivers the non-sense signal to the controller 1744, ahead of the first magnetic pole sensor 1742.

After that, if the controller 1744 receives the non-sense signal from the second magnetic pole sensor 1743, and, after the constant time, the non-sense signal from the first magnetic pole sensor 1742, it senses the opening of the sub-body 1747 and then motivates the switch 1745 to be turned on, thereby activating the display unit 1746.

In the foregoing, while the controller 1744 activates the display unit 1746, it performs, in case that the sub-body 1747 is open to receive a call, a function of connecting a call path and a stand-by function for making a telephone, including an activation of a key pad and a voice output unit. Further, while the controller 1744 inactivates the display unit 1746, it conducts, in case that the sub-body 1747 is closed to end the call, a function of disconnecting the call path, including a deactivation of the key pad and voice output unit.

Now, with regard to the opening/closing of the sub-body 1747 in accordance with the fifth embodiment of the present invention, an operation of each element will be described in more detail with reference to FIG. 19.

Firstly, as set forth above, the normal operation of the wireless communication terminal is done in such a way that, when the sub-body 1747 is closed from an open state thereof, if the first magnetic pole sensor 1742 first senses the N magnetic pole from the first magnetic pole generator 1740, and, after the certain time, the second magnetic pole sensor 1743 senses the S magnetic pole from the second magnetic pole generator 1741, the switch 1745 is turned off, thereby deactivating the display unit 1746. In contrast, it is operated in such a manner that, when the sub-body 1747 is open from a close state thereof, if the second magnetic pole sensor 1743 does not sense the S magnetic pole from the second magnetic pole generator 1741, and, after the certain time, the first magnetic pole sensor 1742 does not sense the N magnetic pole from the first magnetic pole generator 1740, the switch 1745 is turned on, thereby activating the display unit 1746.

In the above process, in a state that the sub-body 1747 is open or closed, owing to any magnetic pole caused by an external magnetic pole generation means, if the first magnetic pole sensor 1742 senses the N magnetic pole while the second magnetic pole sensor 1743 does not sense the S magnetic pole, or the first magnetic pole sensor 1742 does not sense the N magnetic pole while the second magnetic pole sensor 1743 senses the S magnetic pole, and, although the first and the second magnetic pole sensors 1742 and 1743 sense or do not sense the N and S magnetic poles, respectively, if the constant time interval is not maintained therebetween, the controller 1744 allows the switch 1745 and the display unit 1746 to be maintained in the previous state.

Meanwhile, it may be implemented such that the present invention can perform the same operation as set forth above by disposing the first and the second magnetic pole generators 1740 and 1741 in the main body 1748, and the first and the second magnetic pole sensors 1742 and 1743 in the sub-body 1747.

Figure 20:
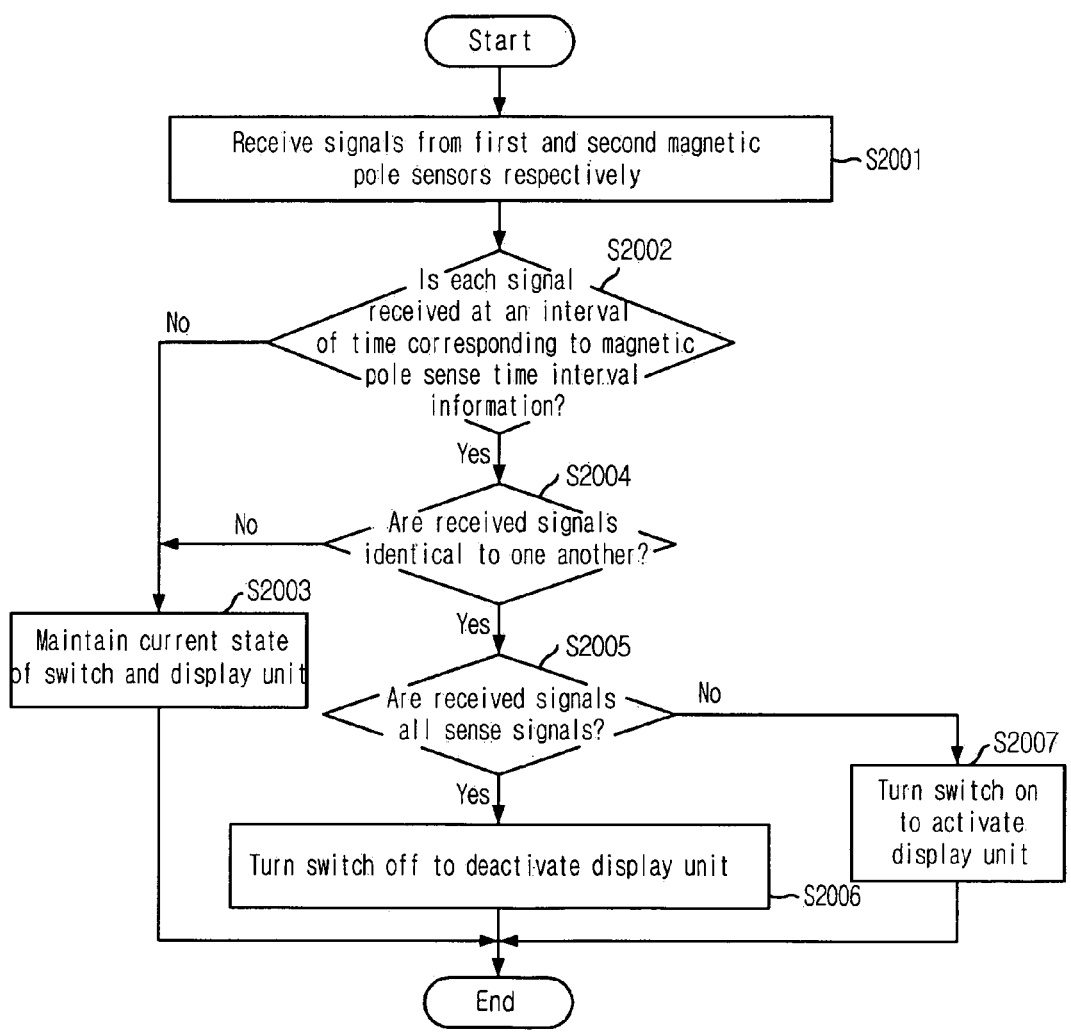
FIG. 20 is an exemplary flowchart of an opening/closing sensing method using the magnetic pole sensors in the wireless communication terminal in accordance with the fifth embodiment of the present invention.

Turning now to FIG. 20, there is shown an exemplary flowchart illustrating an opening/closing sensing method using the magnetic pole sensors in the wireless communication terminal in accordance with the fifth embodiment of the invention.

At a first step S2001, the inventive process receives signals from the first and the second magnetic pole sensors 1742 and 1743, respectively.

At a next step S2002, the process confirms whether or not each signal is received at an interval of constant time. That is, the process confirms whether or not each signal is received at an interval of time corresponding to the magnetic pole sense time interval information stored in the storage unit 1749.

From the confirmation process at step S2002, if each signal is not received at the time interval corresponding to the magnetic pole sense time interval information, the process causes the switch 1745 and the display unit 1746 to be maintained in the current state at step S2003.

In the meantime, in the confirmation process at step S2002, if each signal is received at the time interval corresponding to the magnetic pole sense time interval information, the process again confirms at step S2004 whether or not the received signals are identical to one another.

In the confirmation process at step S2004, if the received signals are not identical, i.e., if one of the received signals is the sense signal and the other is the non-sense signal, the process maintains the current state of the switch 1745 and the display unit 1746 at step S2003.

Meanwhile, if the confirmation result at step S2004 indicates that the received signals are identical, the process again confirms at step S2005 whether the signals are all the sense signals.

In the confirmation process of step S2005, if the received signals are all the sense ones, i.e., if the signals from the first and the second magnetic pole sensors 1742 and 1743 are all the sense ones, at step S2006 the process prompts the switch 1745 to be turned off and then the display unit 1746 to be inactivated.

However, if the received signals are all the non-sense ones, i.e., if the signals from the first and the second magnetic pole sensors 1742 and 1743 are all the non-sense ones, at step S2007 the process motivates the switch 1745 to be turned on and then the display unit 1746 to be activated.

As set forth in the foregoing, the present invention can prevent a malfunctioning of a wireless communication terminal owing to any magnetic pole caused by an external magnetic pole generation means, by activating a display unit via a switch when an opening of a sub-body is sensed or deactivating the display unit via the switch when a closing of the sub-body is sensed, utilizing a plurality of magnetic pole sensors.

While the present invention has been described with respect to the particular embodiments, it will be apparent to those skilled in the art that various changes and modifications may be made without departing from the spirit and scope of the invention as defined in the following claims.

What is claimed is:

1. A wireless communication terminal having a plurality of magnetic pole sensors to sense opening/closing, comprising:

a storing means for storing a first threshold magnetic force and a second threshold magnetic force;

a magnetism generating means for generating magnetism;

a magnetic sensor for sensing an intensity of magnetism generated in the magnetism generating means, which is a magnetic force;

a controlling means for comparing the magnetic force sensed in the magnetic sensor with the first threshold magnetic force and the second threshold magnetic force to thereby produce a comparison result and controlling a switching means to activate/inactivate an output means based on the comparison result;

the switching means switched according to a control signal transmitted from the controlling means to thereby produce a switching result; and the output means activated/inactivated based on the switching result, wherein the controlling means determines that a sub-body is closed when the magnetic force sensed in the magnetic sensor exceeds the first threshold magnetic force and controls the switching means to inactivate the output means, or the controlling means controls the switching means to activate the output means when the sensed magnetic force does not exceed both first and second threshold magnetic forces, whereas the controlling means maintains the switching means and the output means in a current state when the sensed magnetic force does not exceed the first threshold magnetic force but exceeds the second threshold magnetic force.

2. A wireless communication terminal having a plurality of magnetic pole sensors to sense opening/closing, comprising:

a storing means for storing a first threshold magnetic force and a second threshold magnetic force;

a magnetism generating means for generating magnetism;

a magnetic sensor for sensing an intensity of magnetism generated in the magnetism generating means, which is a magnetic force;

a controlling means for comparing the magnetic force sensed in the magnetic sensor with the first threshold magnetic force and the second threshold magnetic force to thereby produce a comparison result and controlling a switching means to activate/inactivate an output means based on the comparison result;

the switching means switched according to a control signal transmitted from the controlling means to thereby produce a switching result; and the output means activated/inactivated based on the switching result, wherein the storing means further includes a threshold time; and the controlling means determines that the sub-body is closed and controls the switching means to inactivate the output means when the magnetic force sensed in the magnetic sensor exceeds the first threshold magnetic force stored in the storing means and time measured from a time point when the magnetic force exceeds the second threshold magnetic force satisfies the threshold time, determines tat the sub-body is open and controls the switching means to activate the output means when the magnetic force sensed in the magnetic sensor exceeds the first and second threshold magnetic forces stored in the storing means and time measured from a time point when the magnetic force does not exceed the first threshold magnetic force satisfies the threshold time, and determines that the sub-body is in the middle of being open or being closed and maintains the switching means and the output means in a current state when the magnetic force sensed in the magnetic sensor does not exceed the first threshold magnetic force stored in the storing means but exceeds the second threshold magnetic force.

3. A wireless communication terminal with an opening/closing sensing function using a plurality of magnetic pole sensors, the wireless communication terminal comprising:

a first magnetic pole generator for generating a north (N) magnetic pole;

a second magnetic pole generator for generating a south (S) magnetic pole;

a first magnetic pole sensor for sensing the N magnetic pole from the first magnetic pole generator;

a second magnetic pole sensor for sensing the S magnetic pole from the second magnetic pole generator;

a controller for controlling an operation of a switch to activate or inactivate an output unit based on the magnetic pole sense result from the first and the second magnetic pole sensors;

the switch performing a switching operation in response to a control signal from the controller; and the output unit activated or inactivated in accordance with the switching operation of the switch, wherein the first and the second magnetic pole generators are placed on one side of a sub-body of the wireless communication terminal, respectively, the first magnetic pole sensor is placed on one side of the lower end of a main body of the wireless communication terminal for sensing the magnetic pole from the first magnetic pole generator in case that the sub-body is closed, and the second magnetic pole sensor is placed on one side of the lower end of the main body of the wireless communication terminal for sensing the magnetic pole from the second magnetic pole generator in ease that the sub body is closed.

4. A wireless communication terminal with an opening/closing sensing function using a plurality of magnetic pole sensors, the wireless communication terminal comprising:

a first magnetic pole generator for generating a north (N) magnetic pole;

a second magnetic pole generator for generating a south (S) magnetic pole;

a first magnetic pole sensor for sensing the N magnetic pole from the first magnetic pole generator;

a second magnetic pole sensor for sensing the S magnetic pole from the second magnetic pole generator;

a controller for controlling an operation of a switch to activate or inactivate an output unit based on the magnetic pole sense result from the first and the second magnetic pole sensors;

the switch performing a switching operation in response to a control signal from the controller; and the output unit activated or inactivated in accordance with the switching operation of the switch, wherein the controller determines the sub-body to be closed upon receipt of a sense signal from each of the first and the second magnetic pole sensors, and then causes the switch to be turned oft to thereby inactivate the output unit; and determines the sub-body to be open upon receipt of a non-sense signal from each of the first and the second magnetic pole sensors, and then causes the switch to be turned-on, to thereby activate the output unit.

5. A wireless communication terminal with an opening/closing sensing function using a plurality of magnetic sensors, the wireless communication terminal comprising:

a magnetic generator for generating a magnetic field;

first and second magnetic sensors for sensing the magnetic field from the magnetic generator, respectively;

a controller for controlling an operation of a switch to activate or inactivate an output unit based on the magnetic sense result from the first and the second magnetic sensors;

the switch performing a switching operation in response to a control signal from the controller; and the output unit activated or inactivated in accordance with the switching operation of the switch, wherein the magnetic generator is placed on one side of a sub-body of the wireless communication terminal, the first magnetic sensor is placed on one side of the lower end of a main body of the wireless communication terminal for sensing the magnetic field from the magnetic pole generator in case that the sub-body is closed, and the second magnetic sensor is placed on one side of the upper end of the main body of the wireless communication terminal for sensing the magnetic field from the magnetic generator in case that the sub-body is open.

6. A wireless communication terminal with an opening/closing sensing function using a plurality of magnetic sensors, the wireless communication terminal comprising:

a magnetic generator for generating a magnetic field;

first and second magnetic sensors for sensing the magnetic field from the magnetic generator, respectively;

a controller for controlling an operation of a switch to activate or inactivate an output unit based on the magnetic sense result from the first and the second magnetic sensors;

the switch performing a switching operation in response to a control signal from the controller; and the output unit activated or inactivated in accordance with the switching operation of the switch, wherein the controller determines the sub-body to be closed upon receipt of a sense signal from the first magnetic sensor and a non-sense signal from the second magnetic sensor, and then causes the switch to be turned off to thereby inactivate the output unit; and determines the sub-body to be open upon receipt of a non-sense signal from the first magnetic sensor and a sense signal from the second magnetic sensor, and then causes the switch to be turned on, to thereby activate the output unit.

7. A wireless communication terminal with an opening/closing sensing function using a plurality of magnetic pole sensors, the wireless communication terminal comprising:

a storage means for storing magnetic pole sense time interval information;

a first magnetic pole generator for generating an N magnetic pole;

a second magnetic pole generator for generating an S magnetic pole;

a first magnetic pole sensor for sensing the N magnetic pole from the first magnetic pole generator;

a second magnetic pole sensor for sensing the S magnetic pole from the second magnetic pole generator;

a controller for sensing an opening/closing using the magnetic pole sense time interval information stored in the storage means when the magnetic poles are sensed by the first and the second magnetic pole sensors, and controlling an operation of a switch to activate or inactivate an output unit based on the sense result;

the switch performing a switching operation in response to a control signal from the controller; and the output unit activated or inactivated in accordance with the switching operation of the switch.

8. The wireless communication terminal as recited in claim 7, wherein the first and the second magnetic pole generators are placed on one side of a sub-body of the wireless communication terminal, the first magnetic pole sensor is placed on one side of a main body of the wireless communication terminal for sensing the N magnetic pole from the first magnetic pole generator before the second magnetic pole sensor senses the S magnetic pole from the second magnetic pole generator in case that the sub-body is closed from an open state, and the second magnetic pole sensor is placed on one side of the main body of the wireless communication terminal for sensing the S magnetic pole from the second magnetic pole generator after the first magnetic pole sensor senses the N magnetic pole from the first magnetic pole generator in case that the sub-body is closed from an open state.

9. The wireless communication terminal as recited in claim 7, wherein the controller determines the sub-body to be closed upon receipt of a sense signal from each of the first and the second magnetic pole sensors at a predefined time interval, and then causes the switch to be turned off, to thereby inactivate the output unit; and determines the sub-body to be open upon receipt of a non-sense signal from each of the first and the second magnetic pole sensors at the predefined time interval, and then causes the switch to be turned on, to thereby activate the output unit.

10. A method for sensing opening/closing by using a plurality of magnetic pole sensors in a wireless communication terminal, comprising the steps of:

a) sensing an intensity of magnetism, which is a magnetic force;

b) checking whether the sensed magnetic force exceeds the first threshold magnetic force;

c) when the sensed magnetic force exceeds the first threshold magnetic force, inactivating an output means by turning off a switching means;

d) when the sensed magnetic force does not exceed the first threshold magnetic force, activating an output means by turning on a switching means;

e) when the sensed magnetic force does not exceed the first threshold magnetic force and does not exceeds a second threshold magnetic force either, determining that a sub-body is open and activating the output means by turning on the switching means; and f) when the sensed magnetic force does not exceed the first threshold magnetic force but exceeds the second threshold magnetic force, maintaining the switching means and the output means in a current state.

11. The method as recited in claim 10, wherein if the sensed magnetic force exceeds the first threshold magnetic force and time measured from a time point when a second threshold magnetic force satisfies a threshold time, the switching means is turned off and the output means is inactivated in the step c); and if the sensed magnetic force does not exceed the first and second threshold magnetic forces and time measured from a time point when the sensed magnetic force does not exceed the first threshold magnetic force satisfies the threshold time, the switching means is turned on and the output means is activated in the step e).

12. An opening/closing sensing method using a plurality of magnetic pole sensors in a wireless communication terminal, the method comprising the steps of:

determining whether or not signals provided from first and second magnetic pole sensors are identical to one another;

if it is determined that the signals are not identical, maintaining a current state of a switch and an output unit;

if it is determined that the signals are identical, confirming if the signals are all sense signals;

if it is confirmed that the signals are all the sense signals, causing the switch to be turned off, to thereby inactivate the output unit; and if it is confirmed that the signals are not all the sense signals, causing the switch to be turned on, to thereby activate the output unit.

13. An opening/closing sensing method using a plurality of magnetic pole sensors in a wireless communication terminal, the method comprising the steps of:
- determining whether or not one of signals provided from first and second magnetic pole sensors is a sense signal and the other signal is a non-sense signal;
- if the determined result indicates that it is not the case that one signal is the sense signal and the other signal is the non-sense signal, maintaining a current state of a switch and an output unit;
- if the determined result indicates that it is the case that one signal is the sense signal and the other signal is the non-sense signal, confirming whether or not the sense signal is received from one of the first and the second magnetic pole sensors;
- if it is confirmed that the sense signal is from the first magnetic pole sensor, causing the switch to be turned oft to thereby inactivate the output unit; and
- if it is confirmed that the sense signal is from the second magnetic pole sensor, causing the switch to be turned on, to thereby activate the output unit.

14. A method for sensing opening/closing by using a plurality of magnetic sensors in a wireless communication terminal, comprising the steps of:
- a) receiving a no-sensing signal from one magnetic sensor;
- b) receiving a sensing signal from another magnetic sensor;
- c) checking whether the sensing signal is received within a magnetism sensing threshold time after receipt of the no-sensing signal;
- d) if the sensing signal is not received within a magnetism sensing threshold time, maintaining a switching means and an output means in a current state;
- e) if the sensing signal is received within a magnetism sensing threshold time, determining that one magnetic sensor is a first magnetic sensor and another magnetic sensor is a second magnetic sensor;
- f) if one magnetic sensor is a first magnetic sensor and another magnetic sensor is a second magnetic sensor, determining that a sub-body is open and activating an output means by turning on a switching means; and
- g) if one magnetic sensor is a second magnetic sensor and another magnetic sensor is a first magnetic sensor, determining that a sub-body is closed and inactivating an output means by turning off a switching means.

15. An opening/closing sensing method using a plurality of magnetic pole sensors in a wireless communication terminal, the method comprising the steps of:
- confirming whether or not signals from first and second magnetic pole sensors are received at a predefined time interval which corresponds to magnetic pole sensing time interval information;
- if it is confirmed tat the signals are not received at the predefined time interval, maintaining a current state of a switch and an output unit;
- if it is confirmed that the signals are received at the predefined time interval, determining whether or not the signals are identical to each other;
- if it is determined that the signals are not identical, maintaining a current state of the switch and the output unit;
- if it is determined that the signals are identical, confirming if the signals are all sense signals;
- if it is confirmed that the signals are all the sense signals, causing the switch to be turned off, to thereby inactivate the output unit; and
- if it is confirmed that the signals are all the non-sense signals, causing the switch to be turned on, to thereby activate the output unit.

* * * * *